July 5, 1960 — G. A. CRIDER — 2,943,653
BLIND DOWELING DRILLER
Filed March 31, 1958
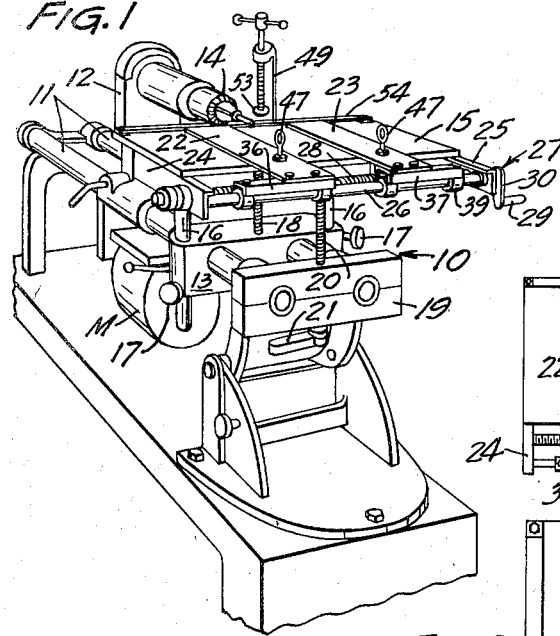
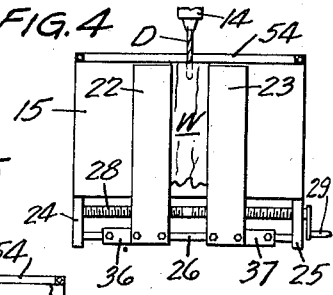
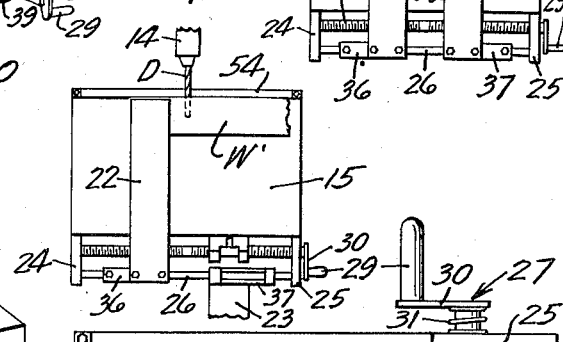
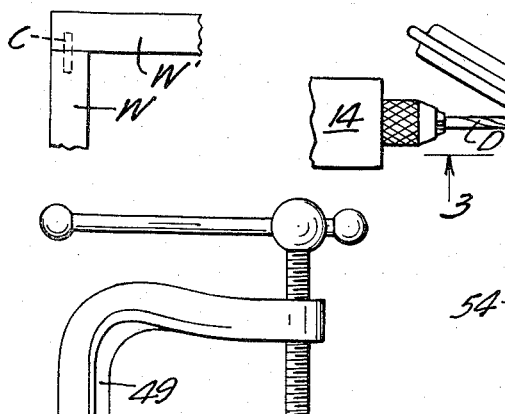
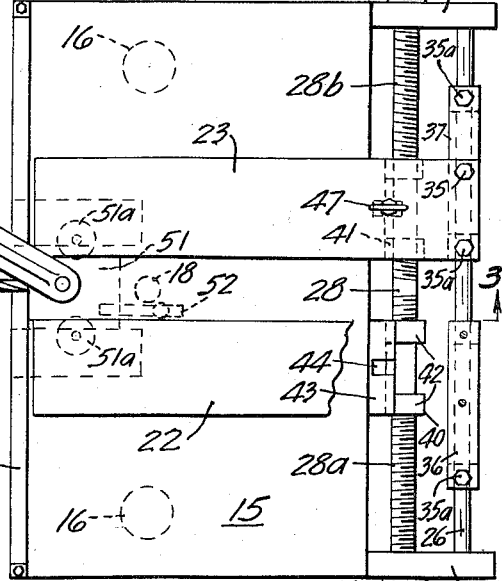
INVENTOR
GORDON A. CRIDER
BY Williamson, Schroeder, Adams & Palmatier
ATTORNEYS

United States Patent Office 2,943,653
Patented July 5, 1960

2,943,653
BLIND DOWELING DRILLER
Gordon A. Crider, Litchfield, Minn.
Filed Mar. 31, 1958, Ser. No. 725,250
4 Claims. (Cl. 144—92)

This invention relates to apparatus for properly locating and producing matching dowel holes in workpieces.

An object of my invention is the provision in a dowel hole producing mechanism, of new and improved workpiece positioning and clamping apparatus of simple and inexpensive construction and operation.

Another object of my invention is the provision of novel apparatus in a blind dowel hole producing mechanism for properly positioning and holding workpieces which are to be joined together at right angles with each other.

A further object of my invention is the provision of novel and improved apparatus for producing dowel holes in workpieces which are to be secured together by blind doweling without necessitating the marking on the workpiece of the dowel hole centers.

These and other objects and advantages of my invention will more fully appear from the following description made in connection with the accompanying drawings wherein like reference characters refer to the same or similar parts throughout the several views and in which:

Fig. 1 is a perspective view of the invention;

Fig. 2 is a top plan view of the invention shown in Fig. 1, with a portion of the structure broken away for clarity of detail;

Fig. 3 is a detail section view taken on a vertical plane substantially at 3—3 in Fig. 2;

Figs. 4 and 5 are somewhat diagrammatic top plan views of the apparatus showing successive steps in the use of the invention for producing dowel holes in matched workpieces which are to be doweled together; and Fig. 6 is a detail plan view showing the workpieces of Figs. 4 and 5 doweled together.

One form of the present invention is shown in the drawings and is described herein. The apparatus includes a supporting structure which is indicated in general by numeral 10. The supporting structure 10 may be of any suitable design, and in the form shown, includes a pair of posts 11 which are oriented horizontally and which carry a drill press head 12 and a worktable supporting block 13 to permit adjustment thereof relative to each other along the posts 11. The drill press head 12 includes a chuck 14 oriented in a horizontal position for carrying and rotating the drill D about a horizontal axis. The drill press head 12 is of conventional design and includes mechanism (not shown) facilitating movement of the chuck 14 and drill D into the dotted position B shown in Fig. 3. The power is supplied to the drill press head 12 from the motor M.

Means are provided for supporting workpieces adjacent the drill D, and in the form shown, the worktable 15 is affixed to, as by welding, a pair of upright supporting posts 16 which are vertically adjustable in the block 13 and are adapted to be secured therein as by thumb screws 17. A screw 18 may be threaded upwardly through the block 13 and may bear against the bottom side of table 15 to permit ready and easy vertical adjustment of the table 15 when the thumb screws 17 are loosened.

Another supporting block 19 is carried on the ends of posts 11 and has a second vertical screw 20 threaded upwardly therethrough and bearing against the bottom side of table 15 adjacent its outer end for providing additional support for the table. Screw 20 may have a crank 21 on its lower end to facilitate ready and easy vertical adjustment.

A pair of workpiece positioning and clamping jaws 22 and 23 are provided in overlying relationship with the table 15. The jaws 22 and 23 are constructed of flat elongate plates which extend into proximity with the drill D and are oriented in parallel relation with the rotation axis of the drill and equidistant from the drill on opposite sides thereof.

Mounting means are provided for supporting the jaws 22 and 23 and permitting movement thereof toward and away from each other. In the form shown, a pair of angle iron frame elements 24 and 25 are affixed to the lower side of table 15 adjacent opposite edges thereof, and a stationary rod 26 extends between the frame elements 24 and 25 and is affixed thereto.

Jaw-positioning apparatus, indicated in general by numeral 27 is provided for moving the jaws 22 and 23 toward and away from each other and for holding the jaws in preset positions with each other. In the form shown, such means include an elongated threaded rod 28 journaled at its opposite ends in bearing apertures in the frame elements 24 and 25. Means are provided on the rod 28 for restraining the same from moving in a longitudinal direction and for adjusting the longitudinal position of the rod with respect to the frame members 24 and 25 and with respect to the table 15. In the form shown, the rod 28 has a handle 29 secured to a plate 30 which is affixed to the end of rod 28 and which acts as a retainer for a compression spring 31 which bears against the frame element 25. The other end of the rod 28 has a pair of retaining collars 32 and 33 secured thereon as by set screws, and the collar 33 has a pair of screws 34 on opposite sides thereof and extending longitudinally therethrough in tapped apertures and bearing against the collar 32 to permit minute longitudinal adjustment of the rod 28 with respect to the table 15. It will be noted that rod 28 is threaded in opposite directions at its opposite end portions 28a and 28b respectively.

Each of the jaws 22 and 23 is provided with means interconnecting the jaw with the jaw-positioning apparatus 27 and with the mounting rod 26 to permit lifting of the jaw off the table 15 so as to permit a workpiece to be laid endwise against the other jaw. In the form shown, the outer ends of the jaws 22 and 23 are connected as by screws 35 to short lengths of channels 36 and 37. The channels 36 and 37 are affixed as by screws 35a to collars 39 which are mounted on and are slidable along the rod 26. The jaws 22 and 23 are thereby swingably mounted with respect to the rod 26 and may thereby be lifted upwardly off the table 15.

Carriages 40 and 41 are mounted on the opposite end portions 28a and 28b of the threaded rod 28, and are substantially identical to each other. Each of the carriages 40 and 41 has a pair of internally threaded nuts 42 threadedly mounted on the rod 28 and interconnected by means of a short length of angle iron 43 which is welded to each of the nuts 42. The angle iron 43 has a rectangular aperture or socket hole 44 in the upper surface thereof to receive a depending lug 45 on the lower side of the respective jaw. The lug 45 may comprise a nut threadably connected to the threaded shank 46 of a ring bolt 47 which projects through the corresponding jaw and is affixed therein as by lock nut 48. The lug 45 and the apertured angle iron 43 thereby cooperatively define releasably interlocking elements interconnecting the jaw with the jaw-positioning apparatus to permit upward lifting of the jaw from the table 15.

The apparatus is also provided with a C-clamp 49, the lower stationary jaw 50 of which is affixed as by welding to a mounting plate 51 which is removably secured on the bottom surface of the table 15 by a pair of guides 51a and a spring-pressed retaining element 52. As best seen in Fig. 3 the C-clamp 49 is oriented obliquely with respect to the drill rotation axis and the upper movable jaw 53 is positioned above the workpiece for clamping the workpiece downwardly onto the table during drilling.

A workpiece-positioning guide 54 is affixed as by screws to the inner edge of the worktable 15 and comprises a flat bar which is spaced above the upper surface of worktable 15 and is oriented normal to the drill rotation axis.

In the use and operation of the invention, particularly with reference to Figs. 4 and 5, an elongated workpiece W, which need not be marked to locate the dowel hole center, is first applied onto the worktable 15 and then the crank 29 is rotated to move the jaws 22 and 23 inwardly toward each other to position the workpiece W in centered and aligned relation with the drill rotation axis. The end of the workpiece W may be moved inwardly against the guide 54 and clamped down by means of C-clamp 49, and then the drill press head 12 will be operated to move the drill forwardly into the end of the workpiece. When the drill has been retracted from the workpiece, it will be noted that the dowel hole is positioned at a predetermined distance from the side edges of the workpiece.

When the drill hole in the workpiece W has been completed, the workpiece W is removed from the table without changing the adjustment of the jaws 22 and 23 and without moving the handle 29. Then in order to produce a properly positioned dowel hole in the workpiece W' so as to be in matched relationship with the dowel hole in the workpiece W, one of the jaws, such as jaw 23 in the example shown, is swung upwardly into the dotted position A seen in Fig. 3 and then to the full line position shown in Fig. 5 wherein the jaw 23 may extend downwardly and slightly outwardly from the rod 26. The jaw 22 remains in its previous position at a predetermined distance from the drill rotation axis. The workpiece W', which need not have been marked to locate the dowel hole center, is then laid on the worktable 15 with one of its side edges against the guide 54 so as to be oriented normal with respect to the drill rotation axis. The end of the workpiece W' is moved into engagement with the jaw 22 and is clamped to the table by C-clamp 49, and then the drill press head 12 is operated to produce a dowel hole in the workpiece W'. It will now be noted that the dowel hole in the workpiece W' is located at a distance from the end thereof which is identical to the distance between the left edge and the dowel hole of the workpiece W so that when the workpiece W' is assembled, by means of a dowel C, the end of the workpiece W' is precisely flush with the side edge of the workpiece W. It is emphasized that the dowel holes have been precisely located without any marking of the stock.

It should be understood, whereas in the example shown in the drawings, the jaw 23 is swung out of the way to permit production of the dowel hole in the workpiece W', the jaw 23 could have been retained in its previous position and the jaw 22 could have been swung outwardly as previously described in order to produce a dowel hole in a workpiece which is to be assembled with the workpiece W in the other direction than illustrated in Fig. 6.

Even though the jaw 23 is swung outwardly as shown in Fig. 5, the jaw 23 may be easily swung down onto the worktable 15 and the lug 45 will be inserted into the aperture 44 of the element 43 so that the jaw 23 will again be properly located for positioning and holding another workpiece W in the identical position as shown or in an adjusted position, wherein the jaws 22 and 23 may be either shifted inwardly toward each other or outwardly away from each other.

It should be noted that the jaws 22 and 23 are adjustable with respect to the table 15 so as to be maintained at equal distances from the drill rotation axis, by means of the longitudinal adjustment of the threaded rod 28. The spring 31 continuously urges the rod 28 in a longitudinal direction so as to continuously urge the collar 32 against the frame element 24. The spring 31 holds the jaw apparatus in alignment and puts tension on the crank to restrain it from turning. When a longitudinal adjustment of the rod 28 is to be made, the collar 32 is slightly loosened from the rod 28 and the screws 34 are adjusted until the rod 28 is properly positioned, whereupon the set screws in the collar 32 are again tightened onto the rod 28 so as to positively retain the rod in its longitudinally adjusted position.

It will be seen that the use of the present apparatus eliminates the need for marking dowel hole centers in pieces of stock secured together by blind doweling. The elimination of need for marking the stock causes a material saving of time in the production of dowel holes, which, of course, is extremely important in a commercial woodworking operation, such as in cabinet shops and the like.

It should further be noted that the present invention is well adapted for use in producing dowel holes in the mitered end surfaces of workpieces which are to be secured together by blind doweling at mitered corners. In this type of use of the apparatus, the mitered end surface of the workpiece is positioned against the guide 54 after one of the jaws, such as 22, has been swung out of operative position. The mitered end surface of the workpiece is moved along the guide 54 until it engages the jaw 23, at which time the drill is operated to produce the dowel hole in the workpiece and through the mitered end surface thereof. It will be noted that the dowel hole produced will extend normal to the plane of the mitered end surface. Likewise, the jaw 22 can be swung into operative position and the jaw 23 may be swung outwardly into inoperative position to facilitate the production of dowel holes in the end surfaces of workpieces which are mitered at another angle and to produce matched blind dowel holes in the various mitered ends of workpieces which are to be secured together by blind doweling.

The dowel holes of workpieces that are to be fitted together are precisely located with respect to each other by the uniform spacing between the jaws 22 and 23 and the axis of the drill.

Furthermore, it should be pointed out that a plurality of dowel holes may be produced in the mitered end surfaces of workpieces that are to be matched together, by first setting the jaws 22 and 23 at a predetermined distance from the drill and then drilling dowel holes in the mitered ends of all the workpieces and subsequently the positions of jaws 22 and 23 are changed and a second set of matching dowel holes are produced in the mitered end surfaces of the workpieces.

Again, it is emphasized that the dowel holes in the mitered end surfaces of workpieces are produced with no marking of the workpiece being necessary for locating the dowel hole centers.

It will be seen that I have provided a new and improved apparatus for producing blind dowel holes in matched unmarked workpieces which are to be interconnected by means of a dowel, so that the end surface of one workpiece will be disposed precisely flush with the edge surface of the other workpiece which is oriented normal to the first workpiece.

It will, of course, be understood that various changes may be made in the form, detail, arrangement and proportion of the parts without departing from the scope of my invention which consists of the matter described herein and set forth in the appended claims.

What I claim is:

1. Mechanism for positioning elongate workpieces to be drilled for doweling, comprising a supporting structure having a worktable and also having means positioning a drill horizontally above the worktable, a pair of elongate and juxtaposed clamping jaws above the table and on opposite sides of the drill axis, jaw-positioning apparatus on the supporting structure and below the top of the worktable for moving the jaws toward and away from each other, interconnecting means below the top of the worktable and between the jaws and the jaw-positioning apparatus and including releasably interlocking elements on one of the jaws and the jaw-positioning apparatus respectively and permitting said one jaw to be lifted upwardly from the table whereby to permit a workpiece to be laid transversely of and endwise against the other jaw and mounting means on the supporting structure and below the top of the worktable adjacent one edge of the worktable, said mounting means swingably supporting said one jaw at one end thereof and permitting said one jaw to be lifted off the worktable and be swung completely below the top of the worktable to be out of obstructing relation with the workpiece on the worktable.

2. Mechanism for positioning elongate workpieces to be drilled in matched relationship with respect to each other for doweling, comprising a supporting structure having a worktable and also having means positioning a drill horizontally above the worktable, a pair of elongate and juxtaposed clamping jaws above the worktable and on opposite sides of the drill axis, jaw-positioning apparatus on the supporting structure and below the top of the worktable for moving the jaws toward and away from each other, means swingably mounting each of said jaws at one end thereof on the supporting structure for movement about an axis extending normal to said drill axis to permit movement of each jaw upwardly from the worktable and permitting movement of the jaws toward and away from each other, and means below the top of the worktable and releasably interconnecting each jaw with the positioning means and permitting each jaw to be individually lifted upwardly off the table to permit a workpiece to be laid endwise against the other jaw and transversely of the drill axis.

3. Mechanism for positioning elongate workpieces to be drilled in matched relationship with respect to each other for doweling, comprising a supporting structure having a worktable and also having means positioning a drill horizontally above the worktable, an elongate workpiece guide adjacent the drill extending transversely of the drill and in upstanding and stationary relation with the worktable, a pair of elongate and juxtaposed clamping jaws parallel to the drill axis and on opposite sides thereof, jaw-positioning apparatus on the supporting structure and below the top of the worktable for moving the jaws toward and away from each other, and a pair of releasably interlocking elements below the top of the worktable and on each of the jaws and on the jaw-positioning apparatus respectively, means pivotally mounting at least one jaw on the supporting structure for movement about an axis lying normal to the drill axis to permit the jaw to be lifted upwardly from the table whereby to permit matched workpieces to be respectively clamped between the jaws and laid endwise against one of the jaws in successive drilling operations to produce dowel holes in the workpieces at predetermined equal distances from edges of the workpieces.

4. The invention set forth in claim 3 wherein said elongate guide is spaced above the worktable to permit passage of shavings and the like therebeneath and thereby prevent the shavings from obstructing proper positioning of the workpiece against the guide.

References Cited in the file of this patent

UNITED STATES PATENTS

| 575,538 | Williamson | Jan. 19, 1897 |
| 827,062 | Frain | July 24, 1905 |
| 995,461 | Holth | June 20, 1911 |
| 2,221,279 | Wheeler | Nov. 12, 1940 |
| 2,600,584 | Snell | June 17, 1952 |
| 2,604,284 | Arp | July 22, 1952 |
| 2,881,645 | Kruchten | Apr. 14, 1959 |

FOREIGN PATENTS

| 434,476 | Germany | Sept. 25, 1926 |
| 545,868 | Germany | Mar. 7, 1932 |
| 582,796 | France | Oct. 20, 1924 |